United States Patent

Hendershot, Jr.

[11] 3,953,750
[45] Apr. 27, 1976

[54] ELECTRIC MOTOR

[75] Inventor: James R. Hendershot, Jr., Amherst, N.H.

[73] Assignee: Vibrac Corporation, Chelmsford, Mass.

[22] Filed: Dec. 20, 1974

[21] Appl. No.: 535,033

[52] U.S. Cl. .............................. 310/154; 310/218; 310/254; 310/266
[51] Int. Cl.² .......................................... H02K 1/18
[58] Field of Search .......... 310/154, 266, 257, 180, 310/254, 152, 190–193, 216–218

[56] References Cited
UNITED STATES PATENTS

| 490,449 | 1/1893 | Lundell | 310/257 |
| 3,356,877 | 12/1967 | Burr | 310/266 |

Primary Examiner—Donovan F. Duggan
Attorney, Agent, or Firm—Schiller & Pandiscio

[57] ABSTRACT

A direct current permanent magnet electric motor is disclosed which comprises a hollow rotatable armature, magnet means mounted concentrically with and spaced radially from the armature, and one or more pairs of pole pieces which directly contact opposite ends of the magnet means and are shaped so that they extend longitudinally or axially between the magnet means and the armature.

13 Claims, 9 Drawing Figures

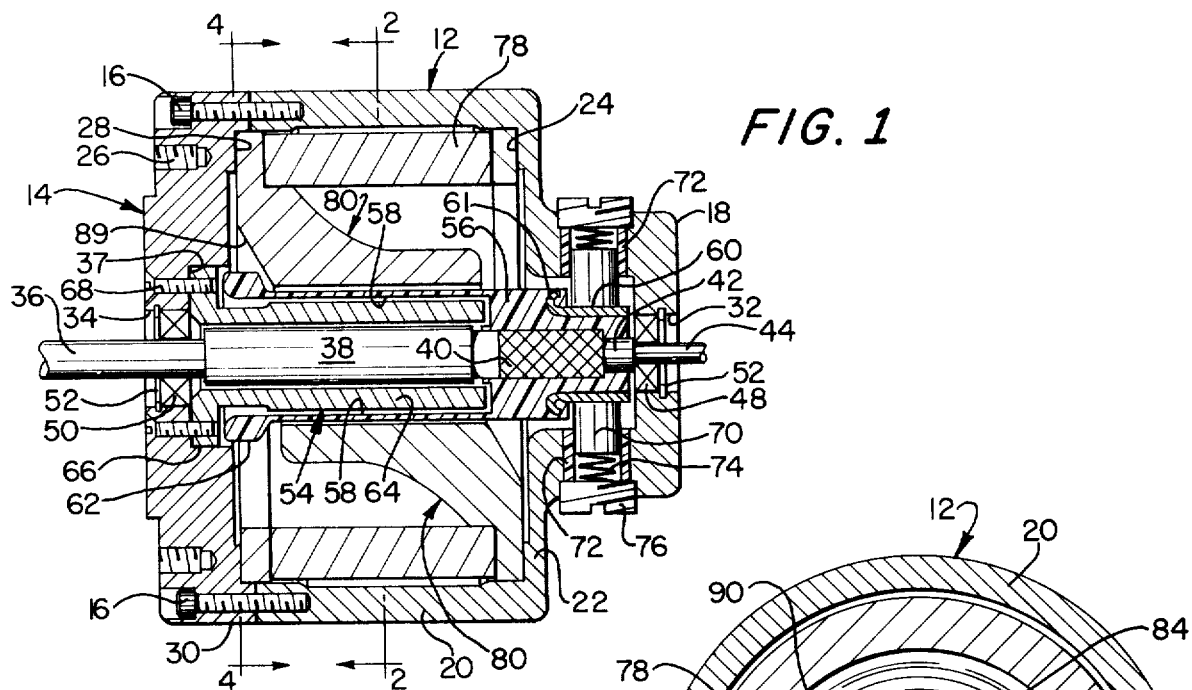
FIG. 1
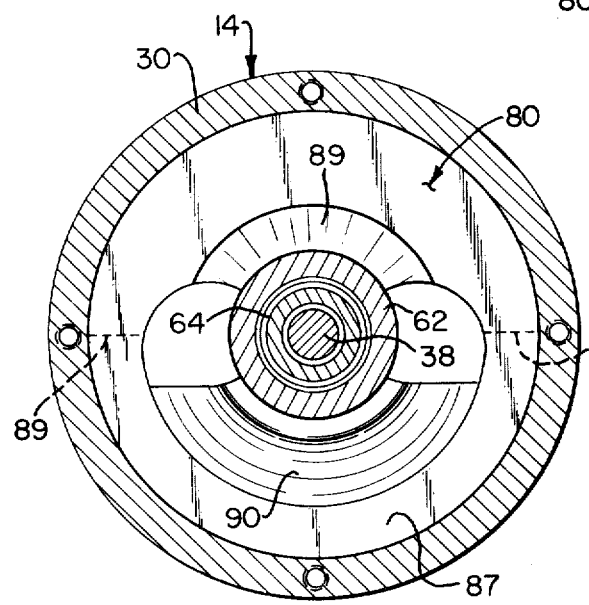
FIG. 2
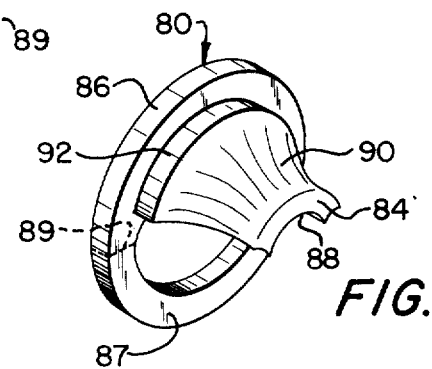
FIG. 3
FIG. 4

ELECTRIC MOTOR

The present invention relates to a high-efficiency direct current electric motor, and more particularly to direct current motors utilizing permanent magnets.

Many permanent magnet direct current motors which are now commercially available comprise a hollow armature which is affixed to and adapted to rotate with the output shaft of the motor. A portion of the armature is radially-spaced from the shaft, so that a stationary cylindrical core of soft-ferrous material can be coaxially mounted therebetween. A cylindrical permanent magnet having integrally-formed, inwardly and radially-directed salient poles is concentrically mounted around the outside of the armature so that a magnetic flux path is established across the gap provided between each pole of the magnet and the cylindrical core, and thus through the armature which lies therebetween. By connecting the armature to a commutator, which in turn is in electrical contact with a pair of brushes, rotation of the motor shaft is produced when the brushes are energized.

The permanent magnet and pole structures utilized in motors heretofore known have posed various manufacturing as well as engineering problems. The required field strength of the magnets is determined by the gap between the magnets and the armature and in order to increase the effective magnetic field intensity, it is necessary to increase the length of width of the magnet poles. However, space requirements limit the size of the poles since they cannot be disposed too closely together since it is desirable to direct the magnetic flux through the armature and not directly between the poles. One motor of the type described is shown and described in U.S. Pat. No. 3102964 issued to Bennett et al. The motor disclosed therein utilizes an integrally-formed permanent magnet which is provided with a longitudinal center bore, and further with a pair of diametrically-opposite, substantially prismatic parallel slots. The slots communicate partially with the bore in order to define a pair of diametrically-opposed salient poles with each pole having an arcuate face coterminus with the center bore. These integrally formed magnets are difficult to manufacture because of the geometrically complex nature of the bore and poles, and thus are relatively expensive.

One suggested solution to eliminate the need for the complex bore and pole structure is to manufacture the poles as separate elements and cement them to the inner surface of a cylindrical magnet. Although this arrangement helps reduce the costs of manfacturing the permanent magnets, it is not satisfactory with respect to providing a relatively strong magnetic field since the intervening cement functions as a gap between the poles and magnet and thereby causes a loss of magnetic flux.

Accordingly, it is the primary object of the present invention to provide a direct current electric motor which overcomes the aforementioned problems.

Another object of the present invention is to provide a high-efficiency, high-output direct current motor comprising an improved magnet and pole construction which is relatively easy and inexpensive to manufacture and assemble.

Yet another object of the present invention is to provide a direct current motor which utilizes standard commercially available cylindrical magnets, magnetic rings or magnetic rods that can be utilized without special tooling.

Still another object of the present invention is to provide a direct current motor having a magnet and pole piece design which is adaptable for various size motors, provides a very large ratio of pole piece area to armature area so as to produce an extremely high flux density through the armature, and allows armatures to be used which have a large length/diameter ratio.

A further object of the present invention is to provide a direct current motor which comprises easily mass-produced pole pieces which are not required to be bonded in place.

And still another object of the present invention is to provide a direct current motor which is easy to assemble and in which there is direct contact between the permanent magnet means and the pole pieces.

These and other objects of the present invention are achieved by a direct current electric motor having a hollow rotatable armature, permanent magnet means concentrically mounted around and spaced from the armature, and individually manufactured pole pieces arranged in pairs and designed so that each can be placed in direct contact with an opposite end of the magnet means, thus sandwiching the magnet between each pair of pole pieces. The magnet means is polarized lengthwise of the axis of rotation of the armature and the pole pieces of each pair are displaced 180° from one another with each pole piece having a portion extending longitudinally or axially between the magnet and armature, with the result that a high magnetic flux density is provided through the armature.

Other features and many of the attendant advantages of the invention are described or rendered obvious by the following detailed description which is to be considered together with the accompanying drawings wherein:

FIG. 1 is a longitudinal sectional view of a preferred embodiment of the present invention;

FIG. 2 is a cross-sectional view taken along line 2—2 in FIG. 1;

FIG. 3 is a perspective view of a pole piece unit utilized in the embodiment of FIG. 1;

FIG. 4 is a cross-sectional view taken along line 4—4 of FIG. 1;

In the several views, like numerals refer to like parts.

Figure 5:
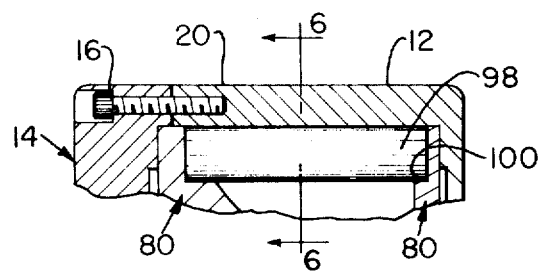
FIG. 5 is a fragmentary longitudinal sectional view of an alternative form of magnet means which can be employed in the motor of FIG. 1.

Referring now to FIG. 1, there is shown a motor which generally comprises a cupped-shaped housing 12 and an end plate 14 which may be secured together by any suitable means such as bolts 16 to form a closed casing. The plate and housing are preferably made of a non-magnetic material such as aluminum or the like. Housing 12 comprises a relatively small diameter end cup section 18, a relatively large diameter cylindrical section 20, and an annular wall section 22 connecting the cup and cylindrical sections together. The inner surface of wall section 22 is machined to form an annular shoulder 24 where it joins cylindrical section 20. The oppostie end of cylindrical section 20 is closed off by end plate 14. The outer surface of end plate 14 is provided with two or more blind holes 26 which are threaded to receive mounting bolts (not shown) for mounting the motor to a supporting structure (not shown). The inner side of end plate 14 is provided with an annular shoulder 28 aligned with shoulder 24 and an end flange 30 having a flat end surface for engaging the adjacent end surface of housing 12.

The cup section 18 of housing 12 and the plate 14 are provided with centrally-located apertures 32 and 34, respectively, in order to receive an output shaft 36, and aperture 34 is countersunk to provide an annular shoulder 37. Shaft 36 is of a circular cross-section and has an enlarged diameter center section 38, stepped armature mounting sections 40 and 42, and a reduced diameter end section 44. Shaft 36 preferably is made of a non-magnetic material such as aluminum, a non-magnetic steel, or the like. The shaft is rotatably supported in the apertures 32 and 34 by means such as bearings 48 and 50, respectively, which are of conventional construction. Thus, although they are not shown in detail, it is to be understood that each bearing assembly comprises an inner race and an outer race separated by a plurality of ball or roller bearings. The inner races are secured to the shaft and the outer races are held in place by retainer rings 52 which are snap fitted in grooves formed in cup section 18 and end plate 14.

A hollow cylindrical armature 54 is coaxially mounted on the shaft 36 to rotate therewith. Hollow armatures are well known in the art and generally comprise electrically conductive windings supported by an insulating matrix or substrate. By way of example, the armature may be of the wound type described in U.S. Pat. Nos. 3212170; 3441761; 3623220, and 3634708, or of the printed circuit type described in U.S. Pat. Nos. 3634708, 3650021, 3668452 and 3678313. Preferably the armature is of the type disclosed in U.S. Pat. No. 3212170 and thus it comprises a closed portion 56 which surrounds and is molded to sections 40 and 42 of shaft 36, a molded hollow cylindrical section 58 that coaxially surrounds and is spaced from the shaft, and a circular array of commutator segments 60 each provided with a tang 61. The free end of cylindrical section 58 is flared outwardly as shown at 62. Also, although not shown, it is to be understood that armature 54 comprises a number of wound electrically conductive overlapping coils held together by an insulating plastic as described and illustrated in said U.S. Pat. No. 3212170. Also, the commutator segments are partially embedded in the plastic matrix and each coil is looped around the tang 61 of a different commutator segment. It will be appreciated that the shaft 36, armature member 54 and commutator 60 form an integral subassembly and that this subassembly constitutes the rotating component of the motor.

The annular space between the shaft 36 and the armature member 54 is provided with a stationary hollow cylindrical core member 64. The core member is provided with a pilot collar portion 66 which is seated against the shoulder 37 of plate 14 and is secured to that plate by screws 68. The core member 64 is disposed so that it is coaxial with a radially spaced from both the shaft 36 and the cylindrical section 58 of armature member 54, whereby shaft 36 and armature 54 are free to rotate with respect to core member 64.

In order to electrically drive the armature member 54, the motor 10 includes a pair of brushes 70 which are mounted at diametrically-opposite positions in the side wall of the end cup section 18 of housing 12. The brushes are mounted in electrical insulation sleeves 72 and are biased into engagement with commutator segments 60 by compression coil springs 74 that are retained by non-conductive screws 76. The brushes 70 are conventional and may be made of any good electrically-conductive material such as silver-graphite or copper. The brushes are electrically connected to a D.C. current source (not shown) in any suitable manner, as will be obvious to one skilled in the art.

The elements of the motor 10 thus far described are all conventional elements and, therefore, equivalents of these elements which are known in the art may be substituted therefor.

The present invention further comprises unique means for providing a permanent magnetic field. In the preferred form of the invention, the motor comprises a hollow cylindrical permanent magnet 78. The magnet 78 is made of any well known magnetic material, such as an aluminum-nickel-cobalt alloy manufactured under the trademark "Alnico", and is magnetized in accordance with techniques well known in the art so that one end is a north magnetic pole and the other end is a south magnetic pole. The magnet 78 is mounted between two pole pieces 80 with the magnet coaxial with armature member 54 and shaft 36 and preferably making a snug fit with casing 12.

The two pole pieces are identical and are designed so that each pole piece can be placed in direct contact with an opposite end of the magnet. The two pole pieces are clamped between the opposite ends of magnet 78 and the adjacent surfaces of the casing, notably annular wall 22 and plate 14. Each pole piece 80 is made of a magnetically conductive material such as a soft ferrous iron or the like.

As shown in FIGS. 1 and 3, each pole piece includes a pole section 84 integrally attached to a closed ring section 86. Each of the pole sections 84 preferably has an inner circularly-curved surface 88 of a constant radius which is positioned close to and radially spaced from the cylindrical section 58 of armature 54. The surface extends through an arc of approximately 90° although this angle may vary. Each pole piece is bevelled at the intersection of its inner surface 88 and its ring section 86 as shown at 89 in order to accommodate the flared end 62 of armature 54. The outer surface 90 of pole section 84 is circularly curved in cross-section with its radius increasing from its free end toward the ring section 86, where it terminates in a cylindrical shoulder 92. The radius of shoulder 92 is set so that the inner surface of the magnet seats snugly on the shoulder, thereby enabling a good contact to be maintained between the two. The ring section 86 of the pole piece is formed with flat surfaces ahd has a substantially constant thickness. The pole section 84 extends parallel to shaft 36 over a substantial portion of the length of the cylindrical section of armature 54 so that a substantial portion of the magnetic field provided by magnet 78 is directed by the two pole pieces through the cylindrical section 58 of armature 54.

Although the invention has been described in its preferred form, various modifications can be made in which the same advantages will be achieved. For example, the section 86 may extend through less than a full circle, in which case a separate spacer element (corresponding, for example, to the portion 87 of section 86 demarcated by the broken line 89 in FIG. 3) may be used to complement the section 86. Also the hollow cylindrical magnet 78 can be replaced by magnetic rods or magnetic rings.

Figure 6:
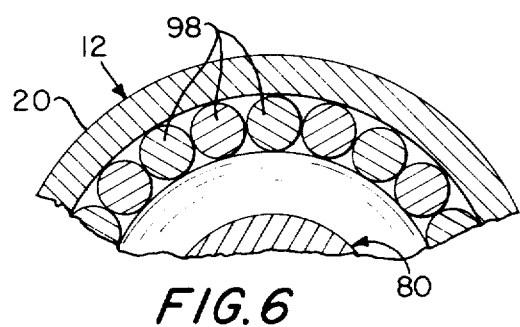
FIG. 6 is a fragmentary cross-sectional view taken along line 6—6 of FIG. 5.

Referring now to FIGS. 5 and 6, permanently magnetized cylindrical rods 98 are substituted for the cylindrical magnet 78. Rods 98 are magnetically polarized axially with their north poles all correspondingly located. The pole pieces 80 are provided with an outer circularly curved shoulder 100 which extends around the entire ring section 86 of the pole piece and is coincidental with shoulder 92. The rods are of uniform size and are retained by shoulders 92 and 100 in a circular array so that they are parallel and engage one another as well as being supported between and maintained in firm contact with pole pieces 80. Although the illustrated rods 98 are shown as being of circular cross-section, it will be appreciated that they may have a different cross-sectional shape, e.g., triangular, square, oval, trapezoidal, polygonal, etc. An advantage of the magnetic rods 98 is that the rods may be easily cut to any length desired, depending upon the size of the motor, without the need for special tooling.

Figure 7:
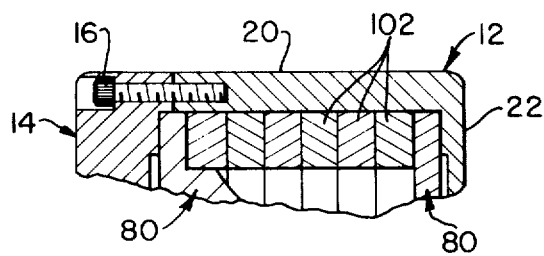
FIG. 7 is a view like FIG. 5 of a second alternative form of magnet means which can be employed in the motor of FIG. 1.

Another embodiment of the invention utilizes a plurality of permanently magnetized rings in place of magnet 78. Referring now to FIG. 7, a plurality of flat permanent magnet rings 102 are positioned in a coaxial relation with armature 54. The permanent magnet rings are sandwiched between the pole pieces so that they are in contact with one another as well as with the pole pieces. The rings are dimensioned so that they make a close fit with the internal wall of the enlarged cylindrical portion 20 of the motor housing. Rings 102 also are magnetized so that their poles are displaced lengthwise of the axis of shaft 36. Each north pole of one ring is positioned adjacent to the south pole of the adjacent ring. An advantage of utilizing magnetic rings is that the strength of the magnetic field can be varied merely by increasing or decreasing the number of rings.

Figure 8:
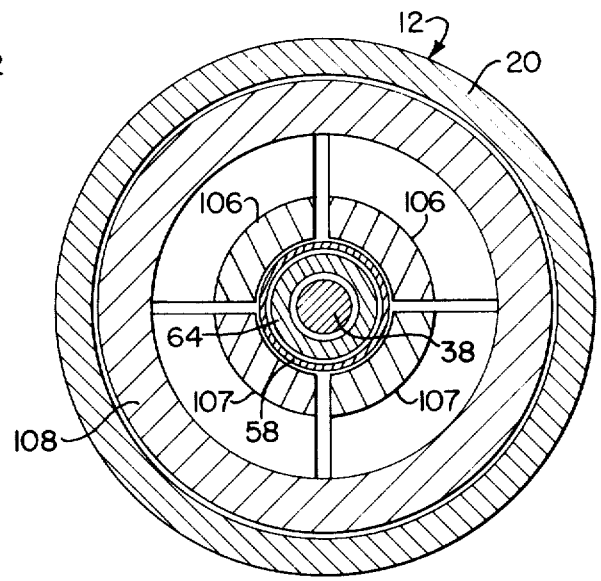
FIG. 8 is a cross-sectional view of another embodiment of the present invention.
Figure 9:
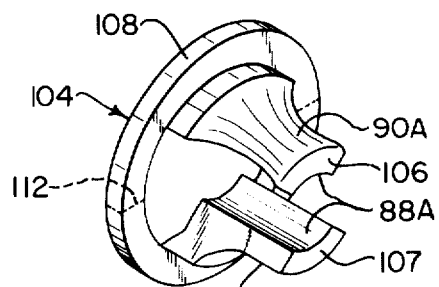
FIG. 9 is a perspective view of a pole piece assembly utilized in the embodiment of FIG. 8.

FIGS. 8 and 9 illustrate a four-pole motor which embodies the principles of the invention. In this case two pole pieces 104 are provided with each pole piece comprising two pole sections 106 and 107 and an integral circular ring section 108. Pole sections 106 and 107 have substantially the same geometric shape as the pole sections 84 of the pole pieces shown in FIG. 3. However, the surfaces 88A and 90A of each pole section extend through an arc of only about ½ the arc of the corresponding surfaces 88 and 90 of pole section 84. The two pole pieces are mounted so that the two pole sections of one are displaced 90° from the two pole sections of the other. If desired, each pole piece may be formed as two discrete parts as shown by the dotted lines 112, so that each part comprises a pole section integral with a semicircular ring section. In either situation, the opposite ends of the magnet means (which may be as shown in FIGs. 1, 5 or &) are engaged by the ring sections of the pole pieces, and the four pole sections extend between the armature and magnet means and are disposed in quadrature relation with one another. Obviously, for such a 4-pole arrangement, the coils of the armature have a pitch of about 90° instead of about 180° as in a two pole motor.

In each of the above described embodiments, the pole pieces and the magnet means are engaged in a tight fitting relation with one another without any intervening air gaps and without need of any cement between the magnet means and pole pieces. Also, in each embodiment the magnets are polarized end to end, i.e., parallel to the axis of shaft 36. Thus, each pole piece engaging one end of the magnet means forms a south pole and each pole piece engaging the other end of the magnetic means forms a north pole. More specifically, with reference to FIG. 1, a magnetic flux path is provided which extends in turn from one end of the magnet means, through one pole piece 80, through the cylindrical section 58 of armature 54, through the magnetic core member 64, back though the cylindrical section 58 of the armature, the opposite pole piece, and the opposite end of the magnet means. With respect to FIGS. 8 and 9, the flux path extends from one end of the magnet means through the two pole sections 106 and 107 of one pole piece, through the cylindrical section 58 of armature 54, through magnetic core member 64, back through the cylindrical section 58 of the armature and the two pole sections of the other pole piece, and the opposite end of the magnet means. As is well known in the art, if a D.C. current supply is coupled across the two brushes, the commutator will be electrically connected to the windings of armature member 54, with the result that the several windings provide magnetic fields which interact with the magnetic field provided by the magnet means and pole pieces to produce torque on armature 54, thereby causing shaft 36 to rotate.

The invention as herein described and illustrated offers a number of important advantages. For one thing, the unique combination of pole pieces and magnet means makes it possible to precisely concentrate the magnetic field of the magnet means so as to maximize the effect of such field on the windings of the armature, and makes possible high performance motors having one or more pairs of pole sections extending close and parallel to the hollow armature. In this connection it is to be noted that the invention is adaptable, for example, to provide an eight-pole motor. Another advantage resides in the fact that the unique pole pieces allow armatures to be used which have relatively large length/diameter ratios; also the ratio of the area of the pole pieces to the area of the armature is large enough to assure a high magnetic flux density through the armature. Still another advantage is achieved by the fact that the magnet means may take various forms as described and thus a substantial tolerance is provided with respect to the size and capacity of the motor. Still other advantages will be obvious to persons skilled in the art.

Since certain changes may be made in the above apparatus without departing from the scope of the invention herein involved, it is intended that all matter contained in the above description or shown in the accompanying drawing shall be interpreted in an illustrative and not in a limiting sense.

What is claimed is:
1. An electric motor, comprising:
   a rotatable output shaft;
   a hollow armature concentrically mounted on said shaft so that at least a portion of said armature is radially spaced from said shaft;
   means for electrically energizing said armature;
   a stationary, magnetically-conductive core member extending into the space provided between said armature and said shaft;
   magnet means for producing a magnetic field, said magnet means being mounted outside of and spaced radially from said armature;

a hollow casing containing said armature, said core member and said magnet means; and at least two pole pieces of magnetically conductive material disposed within said casing and engaging opposite ends of said magnet means, each of said pole pieces having a pole section which extends axially in the space between said armature and said magnet means and is radially spaced from said armature and said magnet means.

2. A motor in accordance with claim 1, wherein each pole piece includes an end section integral with said pole section, said pole section and end section providing an outer shoulder which engages and retains one end of said magnet means.

3. A motor in accordance with claim 1 wherein said magnet means comprises a hollow cylindrical magnet.

4. A motor in accordance with claim 1 wherein said magnet means comprises a plurality of elongate permanently magnetized rods.

5. A motor in accordance with claim 1 wherein said magnet means comprises a plurality of magnetic rings.

6. A motor in accordance with claim 2 wherin said pole section has a circularly-curved inner surface of constant radius and an outer surface having a radius which increases with decreasing distance from said end sections.

7. A motor in accordance with claim 2 wherein said end section of each of said pole pieces has an outer surface disposed in close fitting relation with the internal surface of said casing.

8. A motor in accordance with claim 1 wherein each of said pole pieces includes diametrically opposed pole sections and an end section.

9. A motor in accordance with claim 8 wherein the two pole sections of one pole piece are displaced approximately 90° with respect to the pole sections of the other pole piece.

10. A motor in accordance with claim 1 wherein each pole piece has more than one pole section with the pole sections of one piece displaced from the pole sections of the other pole piece.

11. A motor in accordance with claim 1 wherein said magnet means is a permanent magnet.

12. An electrical motor, comprising:

a rotatable output shaft;

a hollow armature concentrically mounted on said shaft so that at least a portion of said armature is radially spaced from said shaft;

means for electrically energizing said armature;

a stationary, magnetically-conductive core member extending into the space provided between said armature and said shaft;

magnet means for producing a magnetic field, said magnet means being mounted outside of and spaced radially from said armature;

a hollow casing containing said armature, said core member and said magnet means; and at least two pole pieces of magnetically conductive material disposed within said casing and engaging opposite ends of said magnet means, each of said pole pieces being clamped between said magnet means and a portion of said casing and each of said pole pieces having a pole section which extends axially in the space between said armature and said magnet means and is radially spaced from said armature.

13. A motor in accordance with claim 11 wherein said magnet means has a north magnetic pole at one of said opposite ends and a south magnetic pole at the other of said opposite ends.

* * * * *